June 4, 1974  O. G. MOLINA  3,814,695

WATER WASHABLE PENETRANT

Filed Dec. 23, 1971

*INVENTOR.*
ORLANDO G. MOLINA

ATTORNEY

United States Patent Office 3,814,695
Patented June 4, 1974

3,814,695
WATER WASHABLE PENETRANT
Orlando Gomez Molina, Westminster, Calif., assignor to Air Products and Chemicals, Inc.
Continuation-in-part of abandoned application Ser. No. 833,208, Jan. 16, 1969. This application Dec. 23, 1971, Ser. No. 211,631
Int. Cl. C09k 1/02, 3/00; G01n 29/04
U.S. Cl. 252—301.2 P
8 Claims

ABSTRACT OF THE DISCLOSURE

This disclosure is of a dye penetrant composition in liquid form adapted to enter minute surface defects when coated uniformly over a workpiece surface and to dry rapidly thereafter. The composition includes a wetting agent whereby the coated surface may be washed clean by application of water to remove excess penetrant, leaving only residual dye in the minute defects. Where the composition contains fluorescent dye, inspection is accomplished by viewing the workpiece under black light to detect residual traces of dye on the bare surface. Where daylight visible dye is used in the penetrant composition, a developer including a wetting agent similar to that in the penetrant may be applied after the mentioned washing step to render the dye visible in the developer coating, which is thereafter removed by water washing when the inspection is completed.

SUMMARY OF THE INVENTION

This application is a continuation-in-part of copending Application Ser. No. 833,208, filed Jan. 16, 1969 now abandoned.

According to a preferred embodiment of this invention, a dye penetrant composition is provided which is adaptable for use in a rapid and highly effective two-step inspection process. Thus, the dye penetrant broadly comprises a fluorescing agent, an activator for such agent where required, a plastic medium which dries substantially after application to form a semi-solid film or coating on the workpiece surface thereby inhibiting washability of residual fluorescent agent from within minute surface defects, and a surfactant which functions as a wetting agent to cause structural fragmentation and separation of excess dye penetrant from the workpiece surface upon application of water to tse stated film or coating. The dye penetrant is not water soluble, but reacts with water to fragmentation surface upon application of water to the stated film or coating. The dye penetrant is not water soluble, but reacts with water to fragment or break up structurally and to detach itself from the workpiece surface.

BACKGROUND

Figure 1:
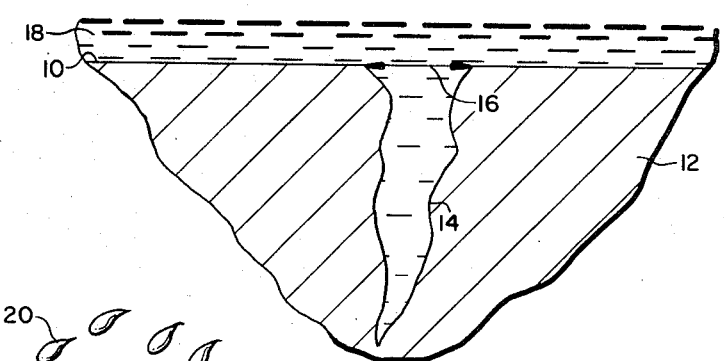
FIG. 1 shows an isolated and greatly enlarged cross-sectional view of a workpiece mass having a surface containing a minute crack sought to be detected by the dye penetrant method disclosed herein and coated with such penetrant, FIG. 2 corresponds with FIG. 1 and shows the mentioned coating of dye penetrant being removed by water spray, FIG. 3 corresponds with FIG. 1 and shows residual dye penetrant remaining within the surface defect after removal of the penetrant according to FIG. 2, and FIG. 4 corresponds generally with FIG. 1 and shows a developer coating on the workpiece surface to form a visibile indication of the mentioned defect.

Liquid dye penetrants have long been known and used to detect surface defects such as cracks in workpiece surfaces. In a typical case, dye penetrant in liquid form is applied to the surface to be inspected, after which the surface is superficially cleaned to remove excess dye therefrom and to leave only residual dye in minute quantities which are retained within the surface voids or defects. Depending upon the penetrant composition, an emulsifying agent or solvent is sometimes used to transform excess penetrant as necessary for solubility of the penetrant in the cleaning solution. Cleaning is often done by scrubbing the surface with a sponge or cloth saturated with the emulsifying agent or cleaning solution, or both.

Particular skill and care are often necessary in the foregoing conventional processes to insure that the specimen surface is not cleaned so completely as to remove minute entrapments of penetrant remaining in surface voids or cracks, the presence of which is essential in discerning such cracks or defects by making visible such entrapments. The cleaning power of the agent or emulsifier, and time of contact with the workpiece surface, are critical considerations in the prior art, requiring extremely close control. After cleaning, if fluorescent dye is used for the process, the specimen surface is then exposed to ultraviolet light to discern any traces of residual dye remaining entrapped in surface defects. If daylight visible dye is used, the specimen after initial cleaning may be coated with a suitable developer adapted to activate, absorb or otherwise make visible the residual dye traces by contrast therewith.

The typical processes described above, and variations thereof, are widely used in industry. It is a distinct disadvantage in practicing such processes that the emulsifiers and cleaning solvents used in removal of excess dye after its initial application to a surface are generally powerful cleaning agents and afford little means for control of the amount or speed with which penetrant is removed. This often results in accidently or unavoidably cleaning most of the penetrant solution or residual dye from surface defects as well as from the surface sought to be inspected. Since the amount of residual dye remaining in the defect is extremely minute, the removal of any portion thereof from the amount initially entrapped therewithin frequently results in failure to detect surface defects regardless of the type of dye being used. Moreover, where the surface to be inspected is of considerable size, such as structural panels of the type forming outer and inner surfaces of missiles or space vehicles which may be eight or ten stories tall and include thousands of square feet of surface, a clear need exists for dye penetrant combinations and cleaning methods capable of achieving a high degree of reliability in disclosing defects combined with improved economy, rapidity and a minimum of required skill in their use. Accordingly, it is a principal object in this case to provide an improved penetrant composition and cleaning method which fills the mentioned need and may, in a given case, accelerate the inspection process considerably by eliminating the use of a developer coating following the initial application of dye and subsequent cleaning of excess dye from the surface sought to be inspected.

DETAILED DESCRIPTION OF INVENTION

Referring to FIG. 1, it may be seen that the invention in this case may be advantageously practiced for rapid and efficient inspection of surfaces such as external surface 10 of workpiece mass 12. Mass 12 contains a crack 14 representative of a minute surface defect or void which is greatly exaggerated and magnified in FIG. 1 for the sake of clarity. Crack 14 communicates with surface 10 at entrance gap 10 which may have a width so narrow as to be virtually invisible to the naked eye in an actual case. A quantity of liquid dye penetrant 18 is applied to surface 10 by suitable means such as spraying the penetrant onto the surface. A portion of dye penetrant 18 enters crack 14 and penetrates deeply therewithin by reason of the relatively low viscosity thereof. Since the novel method disclosed herein is particularly advantageous in connection with inspection of huge workpiece or large surface areas, penetrant 18 is preferably applied by spraying from a movable nozzle requiring only a single operator to cover an area such as 100 sq. ft. in a matter of three or four minutes, or such spraying could be done automatically by a gang of nozzles movable in unison. However, in the case of small workpieces, application of penetrant 18 may occur by dipping the workpiece in a container of penetrant or by applying the liquid penetrant onto surface 10 with a paint brush, roller, or the like.

With particular regard to the composition of liquid dye penetrant 18, it may broadly be noted that a wide variation of constituent materials may be used according to the scope of the invention concept disclosed herein, and that penetrant 18 may be adapted for use either with or without a subsequent developer. Moreover, the teachings herein relating to the property of water washability of penetrant 18 are equally applicable in a developer as discussed hereinbelow, whether or not such developer is used with penetrant 18 or in combination with other penetrants compatible with such developer but already known to the prior art. In any case, penetrant 18 is preferably sprayed on surface 10 and rapidly covers the surface and fills any cracks or voids which may exist therein, after which the penetrant quickly becomes dry.

The terms quick drying or relatively fast drying as used herein refer to the drying characteristic associated with low molecular weight solvents such as suggested for use in the penetrants and developers taught by U.S. Pat. No. 3,279,243 issued Oct. 18, 1966 and further discussed below. Thus, quick drying, as utilized herein, results from evaporation only, and does not require drying procedures such as air blasting or heating in ovens. The stated evaporation typically occurs within five minutes after application of the solvent mixture (penetrant) to a surface in still air at room temperature, and often within 30 seconds. Stated another way, the terms quick drying or relatively fast drying denote a rate of evaporation in still air at room temperature substantially equivalent to the evaporation rate of methyl ethyl ketone or of acetone under the same ambient conditions.

The dye constituent of penetrant 18 may be of a fluorescent type or of a daylight visible type, with only the latter normally involving use of a developer subsequently applied. The fluorescent or daylight visible dyes discussed and specified in mentioned U.S. Pat. 3,279,243 are entirely compatible with the materials contemplated herein for practicing the concept in this case. An example of fluorescent dyes suitable in the present case are Fluoral 7G-A dye sold by General Aniline and Film Corporation and Calcofluor white RW sold by American Cyanamid Company. Suitable daylight visible dyes in this case are insoluble azo type dyes characterized by N to N bonds and having no water-solubilizing groups, such as Oil Red O and Sudan Red sold by General Aniline and Film Corporation. The concentration of such dyes in the water washable penetrant may broadly be within the range of 1.0 to 12% by volume of the penetrant composition.

In addition to the dye as discussed above, penetrant 18 further includes a vehicle which functions as a carrier to convey the dye freely over a specimen surface and into cracks, voids or other defects on the surface, and thereafter preferably in a brief period of time becomes dry or substantially dry. Due to the desirability of rapid drying, primarily by evaporation of one or more constituent elements in the dye penetrant, use of slow drying solvents should generally be avoided in practicing the concept in this case. The mentioned vehicle in penetrant 18 comprises one or more resins as a binder in an amount from 5–40% by volume in combination with one or more solvents in an amount from 10–80% by volume. While various resins are usable in penetrant 18, namely vinyls, acrylics, nitrocellulose, butyrates, and latex, the vinyl polymers and copolymers have been found to produce results superior to all other resins and are preferred. For example, vinyl chloride resin and vinyl chloride vinyl acetate copolymers have been found particularly advantageous. The vehicle in penetrant 18 is preferably a clear lacquer, but may if desired have slight color without masking the dye constituent of the penetrant. For some applications it may be desirable that the vehicle contain a small amount of plasticizer of from 1–5% by volume. Suitable plasticizers for use in combination with the resins discussed above include diisooctyl phthalate, dioctyl phthalate, butyl phthalate, and tri-2-ethylhexyl. Other commercially available plasticizers known to the art may be used with the above resins, the choice depending in part upon the type of solvent and of resin in the penetrant as is well known in the art. The vehicle used in penetrant 18, including the solvents comprising such vehicle, may advantageously take the forms of resin base paints discussed and disclosed in mentioned U.S. Pat. No. 3,279,-243, with the addition of a suitable detergent or surfactant as discussed further below.

It is a further and very significant feature of the inventive concept in this case that the vehicle component of dye penetrant 18 contemplates and includes a hydrophilic agent commercially known as a surfactant or detergent used in combination with the other ingredients of the penetrant. Various commercially available wetting agents are adaptable for use in the inventive concept disclosed herein, and the invention in this case is not limited to selection of a particular such agent. The wetting agent produces a self-peeling reaction of penetrant 18 when the dried penetrant coating is exposed to water, provided that the agent is used in a sufficient amount for this purpose. What constitutes a sufficient amount will naturally depend upon the type of solvent and resin used in the vehicle but within the purview of this invention will be in the range of from 3% to 25% by volume of a non-ionic surfactant. The wetting agent preferably comprises one or more of the alkyl aryl polyether alcohols or so-called phenyl ethers. The wetting agent must be soluble in water and also soluble in the vehicle comprising penetrant 18. The Triton series of surfactants sold by Union Carbide Chemical Company have been found useful in practicing the concept disclosed herein, including Triton X–15, Triton X–35, Triton X–45, Triton X–100, Triton X–155, Triton DN–65 and others in the same series. Also, certain wetting agents commercially known as Aerosols and made by the American Cyanamid Company have been found adaptable as wetting agents in the water washable penetrant and developer combinations disclosed herein. The foregoing Aerosol products generally comprise odorless esters of sulphonated dicarboxylic acid which in its 10% pure state resembles paraffin. For commercial use, the mentioned products usually are diluted with water in an amount indicated in the product name by a percentage. Thus Aerosol 75% is an aqueous solution of 75% ester of the mentioned type and 25% deionized water by volume. In general, the mentioned esters are dioctyl sodium sulfosuccinates having the composition $CH_2COO$, $CHCPPC_8H_{17}$, $CO_3NA$, and are soluble in practically all non-aqueous media as well as in water. The foregoing mentioned wetting agents and their preparation are known in the prior art and are suggested by U.S. Pats. 2,028,091 and 2,176,423, among others. Of particular suitability in practicing the novel method of this invention are the products known as Tergitol Nonionic NPX and Tergitol Nonionic TMN, both of which are sold by Union Carbide Chemical Company. Tergitol Nonionic NPX is a nonyl phenyl polyethylene glycol ether containing 10.5 mols of ethylene oxide and Tergitol Nonionic TMN is a triethyl nonyl ether of polyethylene glycol containing 6 mols of ethylene oxide. Other nonionic surfactants are also usable in penetrant 18 to produce the fragmentation discussed herein upon contact with water, provided that such surfactants are sufficiently hydrophilic in nature due to the presence of ether-oxygen type groups which are capable of hydrogen bonding with water.

The examples given below are illustrative of the advantages and benefits obtained from use of the novel teachings contained herein and are representative only.

EXAMPLE I

Referring to the drawing in this case, the novel dye penetrant disclosed herein has been used with particular success in disclosing surface defects so minute as to require magnification on the order of 200 times to distinguish residual dye traces where the penetrant 18 comprises by volume from about 15–30% vinyl base paint, from about 8–18% Tergitol Nonionic NPX, from about 30–60% Trichlorethane, and from about 1–8% Fluorol 7G-A fluorescent dye. In the foregoing composition, the mentioned vinyl base paint may advantageously comprise from about 15–25% vinyl chloride vinyl acetate copolymer resin, from 45–65% toluene, from about 5–25% methyl ethyl ketone, and from about 3–10% diisoctyl phthalate, by volume. Illustratively, a vinyl base paint comprising 19% vinyl chloride vinyl acetate copolymer resin, 61% toluene, 14% methyl ethyl ketone and 6% diisoctyl phthalate has been used with great success in practicing the inventive process in this case. A preferred composition of the penetrant may illustratively comprise five parts of the foregoing vinyl base paint, three parts Tergitol Nonionic NPX, fourteen parts Trichloroethane, and one-half part Fluorol 7G-A dye, by volume. This formulation provides excellent fluorescent and peeling properties for practicing the present invention.

EXAMPLE II

A modification of the penetrant formulation of Example I comprises, by volume, from about 10–15% of the vinyl base paint described in Example I, 4–5% Tergitol Nonionic NPX, 20–30% Trichloroethane and 1–8% Fluoral 7G-A fluorescent dye. This penetrant provides excellent flaw indications but requires a longer time for removal by water spray action than the formulations of Example I.

EXAMPLE III

Another embodiment of the penetrant of this invention comprises, by volume, from about 15–30% of the vinyl base paint described in Example I, 8–18% Tergitol Nonionic TMN, 30–60% Trichlorethane and 1–8% Calcofluor White RW. Formulations of the above materials within the stated ranges have excellent water washable characteristics. These formulations fluoresce in the blue range of the spectrum instead of the yellow range as do Example I and II materials.

EXAMPLE IV

A modification of the penetrant formulation of Example III comprises, by volume, from about 10–15% of the vinyl base paint described in Example I, 4–5% Tergitol Nonionic TMN, 20–30% Trichloroethane and 1–8% Calcofluor White RW. Material combinations within these ranges fluoresce in the blue range as do those of Example III but require a longer period of spray washing to effect removal than the formulations of Example III.

Figure 2:
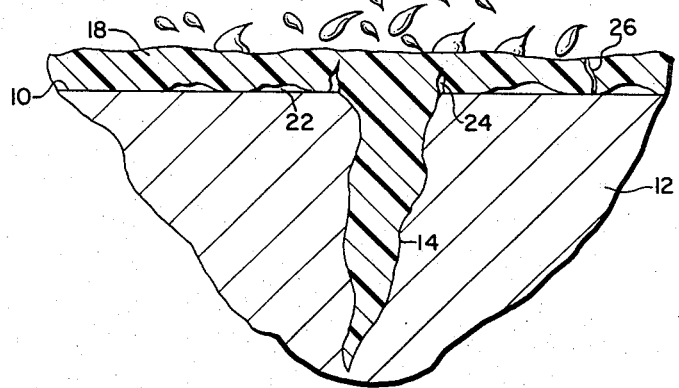
Figure 3:
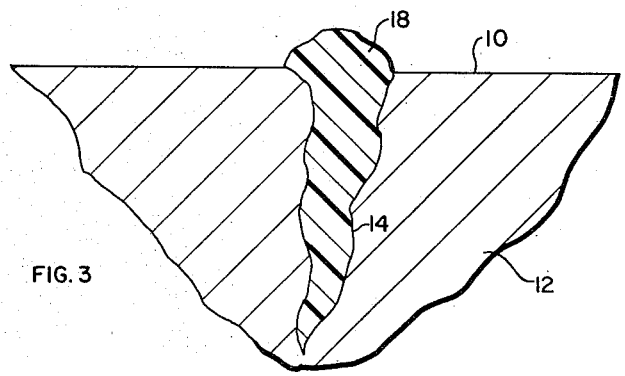
Figure 4:
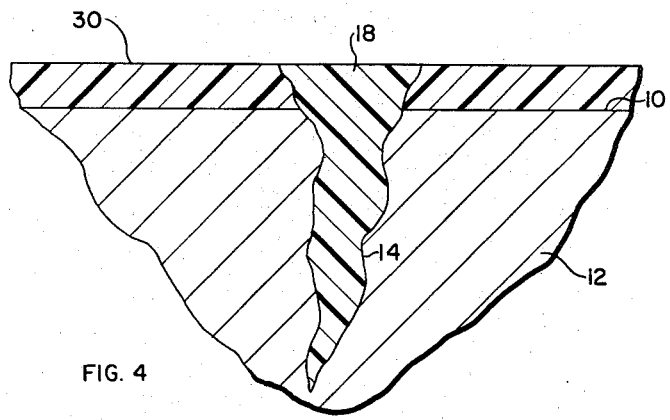

Penetrant 18, after its initial application in liquid form quickly dries to form the resin coating shown in FIG. 2, after which application of water by spraying as suggested by droplets 20 results in rapid and substantially uniform loss of adhesion between penetrant 18 and surface 10 of the workpiece. As a result, cracks or gaps suggested by reference numerals 22, 24 and 26 in FIG. 2 occur in the dried penetrant coating 18 due to structural breakup of the coating. The fragments thus produced will fall from surface 10 under their own weight if surface 10 is vertical or substantially vertical, or will be violently dispersed by the force of impacts of droplets 20 where a pressurized water spray is used to clean penetrant 18 from surface 10. In any event, upon the application of water to the coated workpiece surface as depicted in FIG. 2, surface 10 will be completely cleaned while residual dye remains in the surface defects as suggested by crack 14 in FIG. 3. Where the dye in penetrant 18 is of fluorescent type, workpiece mass 12 can be immediately inspected after the foregoing water-washing step under ultraviolet rays or so-called black light, preferably in conjunction with a microscope or magnifying means where crack 14 is extremely minute. Alternatively, where the dye in penetrant 18 is of the daylight visible type such as oil Red O or the like, a developer 30 which may comprise the same composition as the penetrant 18 except omitting the dye therefrom and adding a nominal amount of titanium dioxide thereto sufficient to give the necessary amount of whiteness for contrast with the dye in penetrant 18 may be applied to the specimen surface 10 as suggested by FIG. 4. Preferably developer 30 should be applied by spraying, since greater speed and better control of the coating thickness are achieved thereby. However, it will be understood that developer 30 may be applied in other ways such as brushing, and that developer 30 may comprise a suitable developer of a conventional type known to the prior art such as those capable of briefly moistening residual dye penetrant 18 within crack 14 to cause bleeding of the same through the developer coating even where an hydrophilic agent is not included in developer 30. Such conventional developers, however, do not have the spray removal characteristics of the present invention.

From the description set forth above, it may be seen that penetrant 18, will in a given case, considerably accelerate the whole inspection process where fluorescent dye is used therein, and removal of excess dye penetrant is achieved simply by spraying the dried penetrant coating with water, or holding the workpiece under a faucet stream, or immersing the coated workpiece in water and agitating the same. Upon contact of the water, a structural fragmenting and complete separation of the coating from surface 10 quickly results, however, residual dye contained within defects such as crack 10 is not reached or penetrated by the water, hence is not affected by the same. As a result, residual dye in sufficiently high concentration remains in crack 14 to render the same visible when viewed in the appropriate manner depending upon the type of dye used in penetrant 18.

While the particular details set forth above are fully capable of attaining the objects and providing the advantages herein stated, the specific materials and method thus disclosed are merely illustrative and could be varied to produce the same results without departing from the scope of the inventive concept as defined in the appended claims.

I claim:

1. A fast drying and readily water washable liquid dye penetrant comprising a vehicle together with a dye soluble in said vehicle wherein:
   said vehicle consists essentially of from 5 to 40% by volume of a vinyl chloride vinyl acetate copolymer resin binder, 10 to 80% by volume solvent, and from 3 to 25% by volume alkylene oxide condensate nonionic surfactant;
   said dye is present in an amount of between 1 and 12% by volume of the penetrant; whereby
   said penetrant exhibits a rate of evaporation substantially equivalent to the rate of evaporation of methyl ethyl ketone or acetone under like ambient conditions and said penetrant is water washable.

2. A liquid dye penetrant according to claim 1 wherein the vehicle includes between 1 and 5% by volume of a plasticizer.

3. A liquid dye penetrant according to claim 2 wherein the plasticizer is selected from the group consisting of diisoctyl phthalate, dioctyl phthalate, butyl phthalate, and tri-2-ethylhexyl.

4. A liquid dye penetrant according to claim 1 wherein the solvent is selected from the group consisting of Trichlorethane, toluene, methyl ethyl ketone and mixtures thereof.

5. A liquid dye penetrant according to claim 1 wherein the nonionic surfactant is selected from the group consisting of an aqueous solution of alkyl aryl polyether alcohols, esters of sulphonated dicarboxylic acid, nonyl phenyl polyethylene glycol ether, or triethyl nonyl ether of polyethylene glycol.

6. A fast drying and readily water washable liquid dye penetrant consisting essentially of:
   10 to 30% by volume of a mixture, said mixture consisting essentially of 15 to 25% by volume vinyl chloride vinyl acetate copolymer resin, 45 to 65% by volume toluene, 5 to 25% by volume methyl ethyl ketone and 3 to 10% by volume diisoctyl phthalate;
   20 to 60% by volume trichlorethane;
   4 to 18% by volume alkylene oxide condensate nonionic surfactant; and
   1 to 8% by volume fluorescent dye.

7. A liquid dye penetrant according to claim 6 wherein the mixture is present in an amount of between 15 and 30% by volume, the trichlorethane is present in an amount of between 30 and 60% by volume and the nonionic surfactant is present in an amount of between 8 and 18% by volume.

8. A liquid dye penetrant according to claim 6 wherein the mixture is present in an amount of between 10 and 15% by volume, and the nonionic surfactant is present in an amount of between 4 and 5% by volume.

References Cited
UNITED STATES PATENTS

| | | | |
|---|---|---|---|
| 3,282,843 | 11/1966 | Alburger | 252—52 |
| 3,311,479 | 3/1967 | Alburger | 106—19 |
| 3,349,041 | 10/1967 | Alburger | 252—408 |
| 3,456,110 | 7/1969 | Diperstein | 252—408 |
| 3,543,570 | 12/1970 | Mlot-Fijalkowski | 252—408 |
| 3,557,015 | 1/1971 | Alburger | 252—408 |

ALLAN LIEBERMAN, Primary Examiner

U.S. Cl. X.R.

73—104; 252—408; 260—31.8 M, 31.8 G, 31.8 H, 32.8 R, 33.6 UA, 33.8 UA, 41 C